US012795709B2

(12) United States Patent
Bian et al.

(10) Patent No.: US 12,795,709 B2
(45) Date of Patent: Nov. 10, 2026

(54) INFORMATION DETECTION METHOD, DEVICE, AND STORAGE MEDIUM

(71) Applicant: ZTE CORPORATION, Shenzhen (CN)

(72) Inventors: Luanjian Bian, Shenzhen (CN); Bo Dai, Shenzhen (CN); Youjun Hu, Shenzhen (CN); Kun Liu, Shenzhen (CN); Weiwei Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 279 days.

(21) Appl. No.: 18/729,678

(22) PCT Filed: Jul. 29, 2022

(86) PCT No.: PCT/CN2022/109219
§ 371 (c)(1),
(2) Date: Jul. 17, 2024

(87) PCT Pub. No.: WO2023/138025
PCT Pub. Date: Jul. 27, 2023

(65) Prior Publication Data
US 2025/0159711 A1 May 15, 2025

(30) Foreign Application Priority Data
Jan. 24, 2022 (CN) ......................... 202210079971.4

(51) Int. Cl.
*H04L 5/00* (2006.01)
*G06K 7/10* (2006.01)
(Continued)

(52) U.S. Cl.
CPC ........ *H04W 72/54* (2023.01); *G06K 7/10019* (2013.01); *H04L 5/0053* (2013.01); *H04W 72/02* (2013.01); *H04W 72/0446* (2013.01)

(58) Field of Classification Search
CPC ...... H04L 5/0053; H04W 4/80; H04W 72/02; H04W 72/0446; H04W 72/54
(Continued)

(56) References Cited

U.S. PATENT DOCUMENTS 10,951,380 B1 * 3/2021 Costa .................... H04L 5/0057
2006/0071758 A1 4/2006 Cooper et al.
(Continued)

FOREIGN PATENT DOCUMENTS

CN 101145183 A 3/2008
CN 101609498 A 12/2009
(Continued)

OTHER PUBLICATIONS

Extended European Search Report in Application No. 22921454.9, dated Nov. 26, 2025, 11 pages.
(Continued)

*Primary Examiner* — Robert J Lopata
(74) *Attorney, Agent, or Firm* — Morgan, Lewis & Bockius LLP

(57) ABSTRACT

Provided are an information detection method, a device and a storage medium. The information detection method applied to a first communication node includes that: quality factor indication information is sent to at least one second communication node; and response information sent by the at least one second communication node is detected based on slots within a slot value range determined according to a quality factor in the quality factor indication information, where in response to that it is detected that response information sent by at least two second communication nodes conflicts in a slot, response information of the at least two of second communication nodes in the conflict slot is detected based on subslots in the conflict slot.

19 Claims, 2 Drawing Sheets

(51) Int. Cl.
*H04W 72/02* (2009.01)
*H04W 72/0446* (2023.01)
*H04W 72/54* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2010/0127829 | A1 | 5/2010 | Daneshmand et al. | |
| 2018/0323887 | A1* | 11/2018 | Azarian Yazdi ...... | H04W 24/08 |
| 2018/0324777 | A1* | 11/2018 | Wang ..................... | H04B 1/713 |
| 2022/0094490 | A1* | 3/2022 | Yang ................... | H04W 72/542 |
| 2023/0063472 | A1* | 3/2023 | Freda ................ | H04W 52/0229 |
| 2023/0354433 | A1* | 11/2023 | Xue .................... | H04W 74/006 |
| 2024/0357486 | A1* | 10/2024 | Wang ................ | H04W 52/0203 |

FOREIGN PATENT DOCUMENTS

| | | | |
|---|---|---|---|
| CN | 105224970 | A | 1/2016 |
| CN | 113691391 | A | 11/2021 |
| JP | H0522206 | A | 1/1993 |
| KR | 100863186 | B1 | 10/2008 |

OTHER PUBLICATIONS

International Search Report in Application No. PCT/CN2022/109219, dated Nov. 1, 2022, 4 pages, including translation.

* cited by examiner

INFORMATION DETECTION METHOD, DEVICE, AND STORAGE MEDIUM

CROSS REFERENCE TO RELATED APPLICATIONS

This is a national stage application filed under 35 U.S.C. 371 based on International Patent Application No. PCT/CN2022/109219, filed Jul. 29, 2022, which claims priority to Chinese Patent Application No. 202210079971.4 filed Jan. 24, 2022, the disclosure of which is incorporated herein by reference in its entirety.

TECHNICAL FIELD

The present application relates to the communication field and, in particular, to an information detection method, a device and a storage medium.

BACKGROUND

In radio frequency identification (RFID) technology, the Q-selection algorithm or the Balanced tree (Btree) algorithm is usually used for completing the identification of electronic tags by the reader/writer, with the aim of avoiding collision of uplink response information sent by multiple electronic tags. In the Q-selection algorithm, a slot value range is determined based on a value of Q. The electronic tag randomly selects a slot within the slot value range and sends a response signal, and the reader/writer detects the tag response slot by slot. In the case where no electronic tag response is detected, the value of Q is decreased; in the case where one electronic tag response is correctly detected, the value of Q remains unchanged; and in the case where it is detected that multiple electronic tag responses conflict, the value of Q is increased. The increase or decrease of the value of Q is determined by an associated varying step size. In practical applications, when the Q-selection algorithm is used, it often occurs that multiple electronic tags randomly send response information in the same slot. In this situation, the reader/writer cannot identify these electronic tags in that slot, resulting in a decrease in the identification efficiency of electronic tags and an increase in the response delay. Moreover, the reader/writer does not know the number of electronic tags conflicting in that slot, so there is no reliable basis for setting the step size, which also leads to a decrease in the identification efficiency of electronic tags.

SUMMARY

Embodiments of the present application provide an information detection method applied to a first communication node. The information detection method includes the following. Quality factor indication information is sent to at least one second communication node; and response information sent by the at least one second communication node is detected based on slots within a slot value range determined according to a quality factor in the quality factor indication information. In response to that it is detected that response information sent by at least two second communication nodes conflicts in a slot, the response information of each of the at least two second communication nodes in the conflict slot is detected based on subslots in the conflict slot.

The embodiments of the present application provide an information detection method applied to a second communication node. The information detection method includes the following. Quality factor indication information sent by a first communication node is received; a slot value range is determined according to a quality factor in the quality factor indication information; and response information is sent to the first communication node in a slot corresponding to a slot value randomly selected from the slot value range. In response to that a first command is detected in the slot corresponding to the selected slot value, response information is sent to the first communication node based on a subslot.

The embodiments of the present application provide a communication device including a memory and one or more processors. The memory is configured to store one or more programs; and the one or more programs, when executed by the one or more processors, cause the one or more processors to perform the information detection method according to any one of the preceding embodiments.

The embodiments of the present application provide a storage medium. A computer program is stored in the storage medium, and the computer program, when executed by a processor, causes the processor to perform the information detection method according to any one of the preceding embodiments.

DETAILED DESCRIPTION

Embodiments of the present application are described hereinafter in conjunction with the drawings. The present application is described hereinafter in conjunction with the embodiments and the drawings. The examples listed hereinafter are intended to explain the present application and not to limit the scope of the present application.

In view of this, the present application provides an information detection method, in which a reader/writer can identify all electronic tags in a conflict slot and determine the varying step size related to the value of Q according to the number of conflicting electronic tags, so the identification efficiency of electronic tags can be improved and the response delay can be reduced.

According to the information detection method in the present application, a subslot-based identification is used on the basis of the related slot Q-selection algorithm and thus combine the slot-based Q selection algorithm with the subslot-based identification to improve the identification efficiency. In the implementation therefor, in the slot Q-selection algorithm, the subslot-based identification is used to identify all terminals in the slot where responses conflict. For the base station and terminals, commands and indication information separately for slots and subslots, as well as operations corresponding to the commands and indication information are provided.

Figure 1:
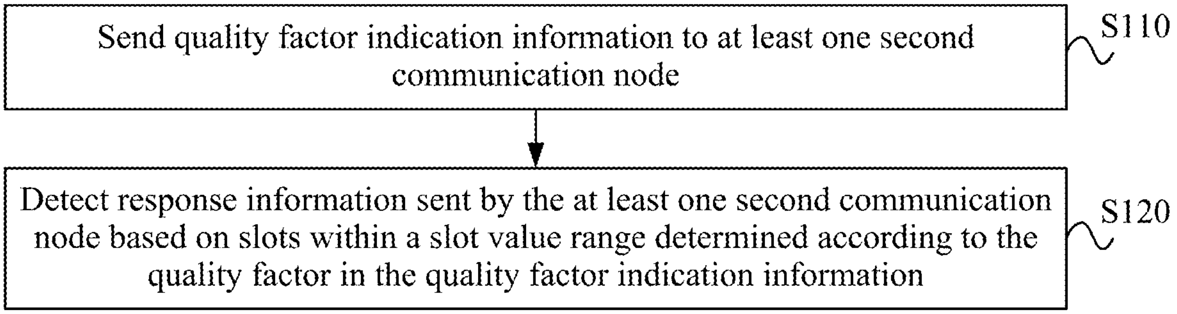
FIG. 1 is a flowchart of an information detection method according to an embodiment of the present application.

In an embodiment, FIG. 1 is a flowchart of an information detection method according to an embodiment of the present application. This embodiment may be implemented by an information detection apparatus. The information detection apparatus is a first communication node. In this example, the first communication node may be a base station, and a second communication node may be a terminal device. As shown in FIG. 1, in this embodiment, the information detection method includes S110 and S120.

In S110, quality factor indication information is sent to at least one second communication node.

In one or more embodiments, the first communication node sends a downlink command to the second communication node to indicate the value of a quality factor.

In S120, response information sent by the at least one second communication node is detected based on slots within a slot value range determined according to the quality factor in the quality factor indication information.

The slot value range refers to the value range of the slot that can be selected. In one or more embodiments, the second communication node determines the slot value range according to the quality factor, and randomly selects a slot value within the slot value range to send the response information to the first communication node based on the slot corresponding to the slot value. In one or more examples, it is assumed that the value of the quality factor is Q, the slot value range may be $2^Q-1$, where Q is a positive integer. In one or more embodiments, the first communication node detects the response information sent by the second communication node slot by slot.

In response to that it is detected that response information sent by at least two second communication nodes conflicts in a slot, response information of each of the at least two second communication nodes in the conflict slot is detected based on subslots in the conflict slot.

In one or more embodiments, there are three cases for the first communication node detecting the response information sent by the second communication node in any slot, and the three cases are, an identification case, an idle case and a conflict case. In an embodiment, the identification case refers to that the first communication node detects response information sent by one second communication node in a slot. The idle case refers to that the first communication node detects no response information sent by any second communication node in a slot. The conflict case refers to that the first communication node detects that response information sent by at least two second communication nodes conflicts in a slot. In one or more embodiments, in response to that the first communication node detects that response information sent by at least two second communication nodes conflicts in a slot, this slot is referred to as a conflict slot. In this conflict slot, the first communication node detects response information sent by each second communication node in the conflict slot based on a subslot of the conflict slot, so the identification efficiency of second communication nodes is improved, and the response delay is reduced.

In an embodiment, in response to that it is not detected that response information sent by at least two second communication nodes conflicts in slot n, a command or indication information of a second information type is sent to at least one second communication node, where the command or indication information of the second information type is used for all second communication nodes with the slot value greater than or equal to slot n+1. In one or more embodiments, the command or indication information of the second information type being used for all second communication nodes with the slot value greater than or equal to slot n+1 includes that the command or indication information of the second information type is applicable to all to-be-identified second communication nodes.

In response to that it is detected that the response information sent by the at least two second communication nodes conflicts in the slot, a command or indication information of a first information type is sent to the at least two second communication nodes, where the command or indication information of the first information type is applied to the at least two second communication nodes in the conflict slot. In one or more embodiments, the command or indication information of the first information type being applied to the second communication node in the slot includes that the command or indication information of the first information type is applicable to to-be-identified second communication nodes in the conflict slot.

In an embodiment, in response to that it is detected that the response information sent by the at least two second communication nodes conflicts in the slot, a first command is sent to the at least two second communication nodes.

The first command is used for instructing that the at least two second communication nodes in the conflict slot to randomly select a subslot from N subslots. In one or more embodiments, in response to that the first communication node detects that the response information sent by the at least two communication nodes conflicts in the slot, the first communication node sends the first command to a second communication node in the conflict slot to instruct the second communication node in the conflict slot to randomly select a subslot value from N subslots and to send response information in the subslot corresponding to the subslot value. N is a positive integer greater than 1. In one or more examples, subslot values corresponding to the N subslots may range from 0 to N−1.

In an embodiment, in response to that response information sent by one second communication node among the at least two second communication nodes is detected in a subslot, a second command is sent.

The second command is used for indicating that the response information is correctly detected; or the second command indicates that the subslot value of the one second communication node among the at least two second communication nodes in the conflict slot is decreased by 1. In one or more embodiments, when the first communication node only detects the response information sent by one second communication node in a subslot, the first communication node sends the second command to the one second communication node. In one or more embodiments, the second command has two functions. One function of the second command is to indicate that the latest response information is correctly detected. The other function of the second command is to indicate that the subslot value of the one second communication node with the subslot value greater than 0 in the conflict slot is decreased by 1.

In an embodiment, in response to that the response information sent by the at least two second communication nodes is detected in a subslot, a third command is sent.

The third command is used for instructing a second communication node with the subslot value equal to 0 among the at least two second communication nodes to randomly reselect a subslot from M subslots; or the third command is used for indicating that the subslot value of a second communication node with the subslot value greater than 0 among the at least two second communication nodes is increased; where M is a positive integer greater than 1. In one or more embodiments, in response to that the first communication node detects response information sent by the at least two second communication nodes in a subslot, that is, the response information detected in the subslot conflicts, the first communication node sends the third command to the at least two second communication nodes. For to-be-identified second communication nodes in the conflict slot, the third command has functions described below. One function of the third command is to instruct the second communication node with the subslot value equal to 0 to randomly reselect a subslot value from M subslots. The other function of the third command is to indicate that the subslot value of a second communication node with the subslot value greater than 0 is increased, where the subslot value is increased by 1 or increased by M−1, or the subslot value is increased by a random numerical value from 0 to M−1. In this manner, the second communication node sends response information in the subslot corresponding to the subslot value. The value of M may be a predefined value or indicated through the third command. In one or more embodiments, M may be the total number of subslot values obtained through the division on the conflict slot.

In one or more embodiments, the second communication node sending the response information in the subslot corresponding to the subslot value includes the following. The second communication node has a subslot value. When the subslot value of the second communication node is equal to 0, the second communication node sends the response information; when the subslot value is not equal to 0, each time a valid command or indication information about the change of a subslot value is received, the subslot value is updated and stored until the stored subslot value is equal to 0, so that the second communication node sends the response information.

In an embodiment, in response to that no response information sent by the at least two second communication nodes is detected in a subslot, a fourth command is sent.

The fourth command indicates that the subslot value of each of the at least two second communication nodes in the conflict slot is decreased by 1. In one or more embodiments, in response to that the first communication node detects no response information sent by the at least two second communication nodes in a subslot, the first communication node sends the fourth command to the at least two second communication nodes. The fourth command includes indication information for subslot value progressive decreasing to indicate that the subslot value of a second communication node with subslot value greater than 0 among the at least two second communication nodes in the conflict slot is decreased by 1.

In an embodiment, the information detection method applied to the first communication node further includes the following. A varying step size S corresponding to the value Q of the quality factor is determined according to the number of the at least two second communication nodes detected in the slot. In one or more embodiments, the first communication node detects response information of each of the at least two second communication nodes in the conflict slot, so as to determine the number of the at least two second communication nodes in the conflict slot and determine the varying step size S related to Q according to the number of the at least two second communication nodes in the conflict slot. In one or more embodiments, the larger the value of the number of the at least two second communication nodes, the larger the varying step size S.

In an embodiment, the varying step size is a product value of a step size coefficient and a step size reference number, where the step size reference number is a predefined value or is indicated by the first communication node. In one or more embodiments, the varying step size related to the value of Q is the product value of the step size coefficient and the step size reference number, where the step size reference number is a predefined value, that is, a fixed value, or is notified by the first communication node to the second communication node.

In an embodiment, in response to that the response information of the at least two second communication nodes is detected in the slot, the step size coefficient is monotonically increasing with the number of the at least two second communication nodes in the slot. In one or more embodiments, when response information sent by the at least two second communication nodes is detected in a slot, the step size coefficient is monotonically increasing with the number of the at least two second communication nodes detected in the slot, that is, the larger the number of the at least two second communication nodes, the larger the step size coefficient. In one or more examples, the step size coefficient is the value of the number of second communication nodes minus 1.

In an embodiment, Q1=Q1+S, and the value of Q1 is stored; Q is equal to rounding Q1 to an integer value, where the initial value of Q1 is indicated through indication information sent by the first communication node to the at least one second communication node. In one or more embodiments, Q1 is the sum of the current Q1 and the varying step size S. The value of Q is the rounded value of Q1. For example, Q1 may be rounded up or down so that the corresponding value of Q is obtained.

Figure 2:
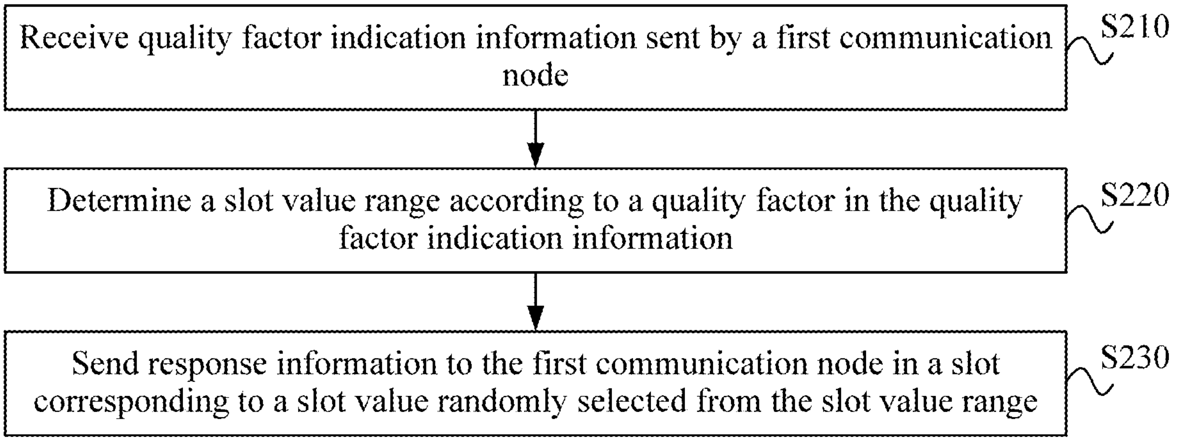
FIG. 2 is another flowchart of an information detection method according to an embodiment of the present application.

In an embodiment, FIG. 2 is another flowchart of an information detection method according to an embodiment of the present application. This embodiment is applied to a second communication node. For example, the second communication node is a terminal. As shown in FIG. 2, the information detection method in this embodiment includes S210 to S230.

In S210, quality factor indication information sent by a first communication node is received.

In S220, a slot value range is determined according to a quality factor in the quality factor indication information.

In S230, response information is sent to the first communication node in a slot corresponding to a slot value randomly selected from the slot value range.

In response to that a first command is detected in the slot corresponding to the selected slot value, response information is sent to the first communication node based on a subslot. In one or more embodiments, the second communication node receives the quality factor indication information sent by the first communication node, determines the slot value range according to the quality factor in the quality factor indication information, randomly selects a slot value within the slot value range, and sends the response information in the slot corresponding to the slot value. When the first communication nodes detects that response information sent by at least two second communication nodes conflicts in the slot corresponding to the slot value selected by the second communication node, the slot is a conflict slot. Then, the first communication node sends a first command to the second communication node in the slot corresponding to the selected slot value to indicate that the second communication node sends the response information to the first communication node based on the subslot.

In an embodiment, in response to that the first command is detected in the slot corresponding to the selected slot value, a subslot value is randomly selected from N subslots, where N is a positive integer greater than 1.

In response to that the subslot value is equal to 0, the response information is sent to the first communication node. The selected slot value refers to the slot value corresponding to the conflict slot. In one or more embodiments, in response to that the second communication node detects the first command in the slot corresponding to the selected slot value, a subslot value is randomly selected from 0 to N−1 subslots, and in response to that the subslot value is equal to 0, the second communication node sends the response information to the first communication node.

In an embodiment, in response to that a second command is detected in the slot corresponding to the selected slot value, whether at least one of the following two conditions is satisfied is determined: no command or information other than the second command is received after the last time the response information is sent; or the response information sent by the second communication node matches confirmation information included in the second command.

In response to that at least one of the two conditions is satisfied, the second communication node can determine that the response information sent by the second communication node is correctly received.

In one or more embodiments, after a to-be-identified second communication node in the conflict slot receives the second command, the to-be-identified second communication node determines whether the response information sent by the second to-be-identified communication node matches the confirmation information included in the second command. When the response information matches the confirmation information, that is, when continuous bits in the response information sent by the to-be-identified second communication node are the same as bits included in the confirmation information, the to-be-identified second communication is identified; and when the response information does not match the confirmation information, the subslot value of the to-be-identified second communication node is decreased by 1.

In one or more embodiments, the subslot value of the second communication node being decreased by 1 indicates that the subslot value stored by the second communication node is decreased by 1. The second communication node updates the stored subslot value each time receiving a valid command or indication information about the change of a subslot value. Until the subslot value is equal to 0, the second communication node sends the response information.

In an embodiment, in response to that a fourth command is detected in the slot corresponding to the selected slot value, when the subslot value of the second communication node is greater than 0, the subslot value of the second communication node is decreased by 1.

In an embodiment, in response to that a third command is detected in the slot corresponding to the selected slot value, when the subslot value of the second communication node is equal to 0 and the response information is not correctly received, a subslot is randomly reselected from M subslots.

When the subslot value of the second communication node is greater than 0, the subslot value of the second communication node is increased by a numerical value.

In an embodiment, the first communication node sends a command to the second communication node, and detects the response information sent by the second communication node, to identify the corresponding second communication node, which includes the following operation 1 to operation 4.

In operation 1, the first communication node sends indication information about a value of Q, and determines the slot value range according to the value of Q.

In one or more embodiments, the first communication node sends a downlink command to the second communication node to indicates the initial value of Q1, where Q satisfies that Q=rounded Q1. The value range of the slot can be determined according to the value of Q. For example, the slot value range is equals to $2^{Q}-1$, where Q is a positive integer.

In operation 2, the second communication node randomly selects a slot value from the slot value range and sends the response information in the slot corresponding to the slot value.

In one or more embodiments, the slot value range is determined according to the value of Q. The second node randomly selects a slot value within the slot value range and sends the response information in the slot corresponding to the slot value.

Sending the response information in the slot corresponding to the slot value includes that: the first communication node sends slot value progressive decrease indication information, and each time the second communication node receives the indication information, the slot counter of the second communication is decreased by 1. In the case where the subslot counter is equal to 0, the second communication node sends the response information.

In one or more embodiments, the response information may be implemented in one of the two forms described below.

In form one, the response information includes a temporary identifier (ID) of the second communication node, and the temporary ID is used for distinguishing and identifying the second communication node. The first communication node can use this temporary ID to send a command and information to corresponding second communication nodes separately.

In form two, the response information includes a product identification serial number of the second communication node, and the product identification serial number of the second communication node is unique.

In operation 3, the first communication node detects the response information sent by the second communication node in slots.

In one or more embodiments, the first communication node detects the response information sent by the second communication node slot by slot, and in any slot, the detection of the response information includes three possibilities: an identification case, an idle case and a conflict case.

First, the identification case is described below.

The identification case refers to that the production identification serial number of one second communication node is detected in a slot. In this case, one of three operation manners described below may be used.

In manner one, the response information sent by the second communication node includes the product identification serial number; the first communication node correctly detects the response information and acquire the product identification serial number of the second communication node. Therefore, the first communication node sends confirmation information to the second communication node, and sends slot value progressive decrease indication information to the second communication node. The confirmation information is used for indicating that the response information sent by the second communication node is correctly detected, and the slot value progressive decrease indication information is used for indicating that the slot counter of the second communication node is decreased by 1.

After a second communication node of which the slot counter is equal to 0 detects the confirmation information, the second communication node determines whether at least one of the following two conditions described below is satisfied: no slot value progressive decrease indication information is received after the last time the response information is sent; or the response information sent by the second communication node matches the detected confirmation information. When at least one of the two conditions is satisfied, the second communication node can determine that the second communication node is identified; and when no one of the two conditions is satisfied, the second communication node determines that the confirmation information is invalid to the second communication node.

After a second communication node of which the slot counter is greater than 0 detects the slot value progressive decrease indication information, the slot counter of the second communication node is decreased by 1.

In manner two, the response information sent by the second communication node includes the product identification serial number; the first communication node correctly detects the response information and acquire the product identification serial number of the second communication node. Therefore, the first communication node sends command A, which has two functions described below. The first function of command A is to indicate to the second communication node that the response information sent by the second communication node is correctly detected; the second function of command A is to indicate that the slot counter of the second communication node is decreased by 1.

After a second communication node of which the slot counter is equal to 0 detects command A, the second communication node determines whether at least one of the following two conditions is satisfied: no slot value progressive decrease indication information is received after the last time the response information is sent; or the response information sent by the second communication node matches confirmation information included in command A. When at least one of the two conditions is satisfied, the second communication node can determine that the second communication node is identified.

After a second communication node of which the slot counter is greater than 0 detects command A, the slot counter of the second communication node is decreased by 1.

In manner three, the response information sent by the second communication node includes the temporary ID of the second communication node. After the first communication node correctly detects the temporary ID, the first communication node sends confirmation information including the temporary ID. After a second communication node of which the slot counter is equal to 0 detects the confirmation information, the second communication node determines whether at least one of the following two conditions is satisfied: no slot value progressive decrease indication information is received after the last time the response information is sent; or the temporary ID sent by the second communication node matches the detected temporary ID. When at least one of the two conditions is satisfied, the second communication node sends the product identification serial number of the second communication node to the first communication node, and after the first communication node receives the product identification serial number, the first communication node sends the slot value progressive decrease indication information to indicate that the slot counter of the second communication node is decreased by 1. After a second communication node of which the slot counter is greater than 0 detects the slot value progressive decrease indication information, the slot counter of the second communication node is decreased by 1.

Second, the idle case is described below.

The idle case refers to that no response information of a second communication node is detected in a slot. In this case, the first communication node sends slot value progressive decrease indication information to indicate that the slot counter of a second communication node is decreased by 1.

Third, the conflict case is described below.

The conflict case refers to that it is detected that response information of multiple second communication nodes conflict in a slot, and the slot is referred to as a conflict slot. A second communication node that sends response information in the conflict slot is referred to as the second communication node in the conflict slot.

In an embodiment, for the conflict case, the first communication node sends slot value progressive decrease indication information to indicate that slot counters of all to-be-identified second communication nodes are decreased by 1; or for the conflict case, the first communication node needs to adjust the value of Q, and therefore sends indication information about the value of Q to indicate a new value of Q, that is, operation 1 is returned to, and operation 2 and operation 3 are continued.

Alternatively, for the conflict case, the operation 4 is further performed.

In operation 4, when it is detected that response information of multiple second communication nodes conflicts in a slot, the first communication node detects response information of each of the multiple second communication nodes in the slot based on subslots in the conflict slot.

In one or more embodiments, the response information of each of the multiple second communication nodes in the conflict slot is detected based on the subslots. Detecting the response information of each of the multiple second communication nodes in the conflict slot based on the subslots includes the following.

The first communication node sends a command F1 to instruct a second communication node in the conflict slot to randomly select a subslot from N subslots. After detecting command F1, the second communication node may determine whether the command F1 is valid to the second communication node through one of the two manners described below.

In a manner one, after the last time the response information is sent, whether the command F1 is detected within a command detection time window corresponding to the response information is determined. The second communication node that detects the command F1 within the command detection time window considers the command F1 to be valid; conversely, the second communication node that does not detect the command F1 within the command detection time window considers the command F1 to be invalid. That is, the second communication node sends the response information the last time at moment t1 and detects the command F1 at moment t2. When t2−t1 is less than or equal to a time domain threshold, the command F1 is valid to the second communication node; when t2−t1 is greater than the time domain threshold, the command F1 is invalid to the second communication node.

In a manner two, when the second communication node receives the command F1 in the slot corresponding to the selected slot value, or receives no slot value progressive decrease indication information after the last time sending the response information, the second communication node considers the command F1 to be valid; otherwise, the second communication node considers the command F1 to be invalid. In one or more embodiments, after the second communication node sends the response information, when the second communication node detects no slot value progressive decrease indication information, the current slot value is not changed, and the second communication node is still in the current slot; at this time, when the command F1 is detected, the current slot is the conflict slot, and the command F1 is valid to the second communication node. After the second communication node sends the response information, when the second communication node first detects the slot value progressive decrease indication information when the current slot value is changed and also detects the command F1, the second communication node is not a second communication node in the current conflict slot, so the command F1 is invalid to the second communication node.

In some implementations, after detecting the command F1 and determining that the command F1 is valid, the second communication node randomly selects a subslot value from 0 to N−1 and sends the response information when the subslot value is equal to 0.

Alternatively, the first communication node sends the command F1 to instruct a to-be-identified second communication node of which the slot counter is equal to 0 to randomly select a subslot from N subslots. When the second communication node of which the slot counter is equal to 0 detects the command F1, the second communication node randomly selects a subslot value from 0 to N−1, and sends the response information when the subslot value is equal to 0. When a second communication node of which the slot counter is not 0 detects the command F1, the second communication node considers the command F1 to be invalid.

In this embodiment, N is greater than 1, and the value of N is a predefined value or is indicated by the command F1.

In one or more embodiments, the first communication node detects response information in a subslot.

The first communication node detects response information of a second communication node in a subslot in one of the three operation manners described below.

In a manner one, the response information includes the product identification serial number of the second communication node. The first communication node correctly detects the response information and acquire the product identification serial number of the second communication node. The first communication node sends command F2, which has two functions described below. The first function of the command F2 is to indicate that the response information is correctly detected; the second function of the command F2 is to indicate that the subslot value of the second communication node in the conflict slot is decreased by 1.

For the second communication nodes in the conflict slot, a second communication node of which the subslot value is equal to 0, after detecting command F2, determines whether at least one of the following two conditions is satisfied: no command or information other than the command F2 is received after the last time the response information is sent; or the response information sent by the second communication node matches confirmation information included in the command F2, that is, continuous bits in the response information are the same as bits included in the confirmation information. When at least one of the two conditions is satisfied, the second communication node can determine that the second communication node is identified. After a second communication node of which the subslot value is greater than 0 detects command F2, the subslot value of the second communication node is decreased by 1.

In manner two, the response information includes the product identification serial number of the second communication node; the first communication node correctly detects the response information and acquire the product identification serial number of the second communication node. Therefore, the first communication node first sends confirmation information, and sends a fourth command including subslot value progressive decrease indication information. The confirmation information is used for indicating that the response information is correctly detected, and the fourth command is used for indicating that the subslot value of the second communication node in the conflict slot is decreased by 1.

For the second communication nodes in the conflict slot, after a second communication node with the subslot value equal to 0 detects the confirmation information, the second communication node determines whether at least one of the following two conditions is satisfied: no command or information other than the confirmation information is received after the last time the response information is sent; or the response information sent by the second communication node matches the detected confirmation information. When at least one of the two conditions is satisfied, the second communication node can determine that the second communication node is identified. After a second communication node with the subslot value greater than 0 detects the fourth command, the subslot value of the second communication node is decreased by 1.

In manner three, the response information includes the temporary ID of the second communication node. After the first communication node correctly detects the temporary ID, the first communication node sends confirmation information including the temporary ID to the second communication node.

For the second communication nodes in the conflict slot, after a second communication node with the subslot value equal to 0 detects the confirmation information, the second communication node determines whether at least one of the following two conditions is satisfied: no command or information other than the confirmation information is received after the last time the response information is sent; or the temporary ID of the second communication node matches the detected temporary ID (that is, the temporary ID of the second communication node is the same as the detected temporary ID). When at least one of the two conditions is satisfied, the second communication node sends the product identification serial number of the second communication node to the first communication node. After receiving the product identification serial number, the first communication node sends the fourth command to indicate that the subslot value of the second communication node in the conflict slot is decreased by 1. After a second communication node with the subslot value greater than 0 detects the fourth command, the subslot value of the second communication node is decreased by 1.

When the first communication node detects that response information of multiple second communication nodes conflict in a subslot, the first communication node sends command F3. For the to-be-identified second communication node in the conflict slot, the command F3 has two functions described below. The first function of the command F3 is to instruct a to-be-identified second communication node with the subslot value equal to 0 to randomly reselect a subslot value from 0 to M−1. The second function of the command F3 is to indicate that the subslot value of a second communication node with the subslot value not equal to 0 is increased, where the subslot value is increased by 1 or M−1 or a random number within 0 to M−1. The value of M is a predefined value or is indicated through the command F3.

When the first communication node detects no response information of a second communication node in a subslot, the first communication node sends a fourth command to indicate that the subslot value of the to-be-identified second communication node in the conflict slot is decreased by 1.

In this embodiment, in the conflict slot, any to-be-identified second communication node sends response information when the subslot value of the to-be-identified second communication node is equal to 0.

In this embodiment, the second communication node, after detecting command F1 and determining that command F1 is valid, can determine the current slot as a conflict slot and determine that the second communication node is a second communication node in the conflict slot.

In this embodiment, when the last command sent by the first communication node in the conflict slot is command F2, command F22 may be used for replacing command F2, where command F22 has the function of command F2; in addition, command F22 is further used for indicating the end of the slot, or command F22 is also used for indicating that the slot counter of the second communication node is decreased by 1. In this way, slot value progressive decrease indication information sent by the first communication node can be omitted. After a second communication node of which the slot counter is greater than 0 detects command F22, the slot counter of the second communication node is decreased by 1.

Alternatively, in this embodiment, after the detection of the response information of each second communication node in the conflict slot based on the subslot value is completed, the first communication node sends the slot value progressive decrease indication information to indicate that the slot counter of the second communication node is decreased by 1. After a second communication node of which the slot counter is greater than 0 detects command F22, the slot counter of the second communication node is decreased by 1.

In this embodiment, each time the first communication node sends the slot value progressive decrease indication information, correspondingly, the previous slot ends or the next slot starts. The duration between two adjacent pieces of slot value progressive decrease indication information is a slot, and the duration of the slot is variable. The operation of detecting the response information of each second communication node in the conflict slot based on the subslots is performed in a same slot, and the slot value is not changed during the performing the operation of detecting.

Therefore, the first communication node can detect the response information of each second communication node in the conflict slot and determine the number of second communication nodes in the conflict slot. The varying step size related to the value of Q is determined according to the number m of the second communication nodes in the conflict slot, where the larger the m, the larger the varying step size, and the value of Q is determined.

In this embodiment, when the value of Q is not changed, operation 3 is returned to; and when the value of Q is changed, operation 1 is returned to until the identification of various second communication nodes is completed.

In an embodiment, an example where the first communication node is a base station and second communication nodes are terminals is used for illustrating the process of determining the quality factor, that is, the value of Q. In one or more embodiments, the process of determining the value of Q includes operations described below.

In operation 1, the varying step size related to the value of Q is determined.

In this embodiment, the varying step size S related to the value of Q is determined according to the number of terminals detected in a slot. Specifically, $S=k*C$, where C is the step size reference number, and C is a fixed value or the C value is notified to the terminal by the base station. k is the step size coefficient, and cases described below are included.

When no response information sent by a terminal is detected in a slot, k is a negative number.

Alternatively, when response information sent by one terminal is correctly detected in a slot, $k=0$.

Alternatively, when it is detected that response information sent by multiple terminals conflicts in a slot, k is monotonically increasing with the number m of terminals detected in the slot, that is, the larger the m, the larger the k; for example, $k=m-1$.

In this embodiment, in the slot where response information sent by terminals conflicts, the reader/writer can determine the step size coefficient k according to the number of terminals in the slot and further determine the varying step size S related to the value of Q.

In operation 2, the value of Q is determined.

In this embodiment, $Q1=Q1+S$, and Q1 is stored.

In some implementations, Q satisfies that Q=rounded Q1, including that Q1 is rounded up or rounded down. The initial value of Q1 is equal to the initial value of Q and is indicated through indication information sent by the base station to the terminal.

In this embodiment, when the value of Q is changed, a new slot value range needs to be determined. The to-be-identified terminal randomly reselects a new slot value within the new slot value range and sends response information in the slot corresponding to the selected slot value.

Figure 3:
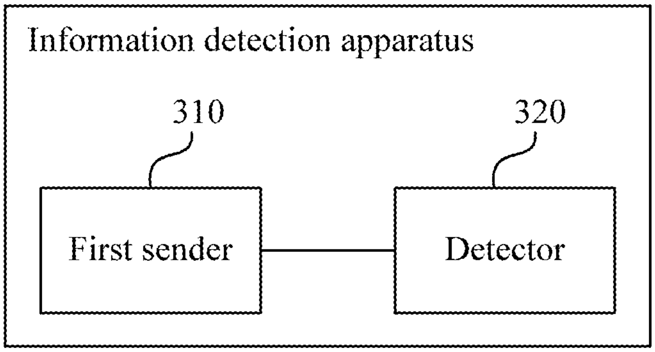
FIG. 3 is a structural diagram of an information detection apparatus according to an embodiment of the present application.

In an embodiment, FIG. 3 is a structural diagram of an information detection apparatus according to an embodiment of the present application. This embodiment is applied to a first communication node. As shown in FIG. 3, the information detection apparatus in this embodiment includes a first sender 310 and a detector 320.

The first sender 310 is configured to send quality factor indication information to at least one second communication node.

The detector 320 is configured to detect response information sent by the second communication node based on slots within a slot value range determined according to a quality factor in the quality factor indication information.

In response to that it is detected that response information sent by at least two second communication nodes conflicts in a slot, response information of each of the at least two second communication nodes is detected based on a subslot in the conflict slot.

In an embodiment, in response to that it is detected that the response information sent by the at least two second communication nodes conflicts in the slot, a command or indication information of a first information type is sent to the at least two second communication nodes, where the command or indication information of the first information type is applied to the second communication node in the conflict slot.

In an embodiment, in response to that it is detected that the response information sent by the at least two second communication nodes conflicts in the slot, a first command is sent to the at least two second communication nodes.

The first command is used for instructing the at least two second communication nodes in the conflict slot to randomly select a subslot from N subslots.

In an embodiment, in response to that response information sent by one of the at least two second communication nodes is detected in a subslot, a second command is sent.

The second command indicates that the response information is correctly detected; or the second command indicates that the subslot value of the one of the at least two second communication nodes in the conflict slot is decreased by 1.

In an embodiment, in response to that it is detected that the response information sent by the at least two second communication nodes conflicts in a subslot, a third command is sent.

The third command is used for instructing a second communication node with the subslot value equal to 0, among the at least two second communication nodes, to randomly reselect a subslot from M subslots; or the third command is used for indicating that a subslot value of a second communication node with the subslot value greater than 0, among the at least two second communication nodes, is increased. Herein, M is a positive integer greater than 1.

In an embodiment, in response to that no response information sent by the at least two second communication nodes is detected in a subslot, a fourth command is sent.

The fourth command is used for indicating that a subslot value of a second communication node among the at least two second communication node in the conflict slot is decreased by 1.

In an embodiment, the information detection apparatus applied to a first communication node further includes a determination module. The determination module is configured to determine a varying step size S corresponding to a value Q of the quality factor based on the number of second communication nodes detected in one slot.

In an embodiment, the varying step size is a product value of a step size coefficient and a step size reference number, where the step size reference number is a predefined value or is indicated by the first communication node.

In an embodiment, in response to that the response information of the at least two second communication nodes is detected in the one slot, the step size coefficient is monotonically increasing with the number of second communication nodes in the one slot.

In an embodiment, Q1=Q1+S, where the value of Q1 is stored; Q is equal to rounding Q1 to an integer value, where the initial value of Q1 is indicated by the first communication node sending indication information to the second communication node.

The information detection apparatus provided in this embodiment is configured to implement the information detection method applied to a first communication node in the embodiments shown in FIG. 1. The information detection apparatus provided in this embodiment uses similar implementation principles and has similar technical effects, which are not repeated herein.

Figure 4:
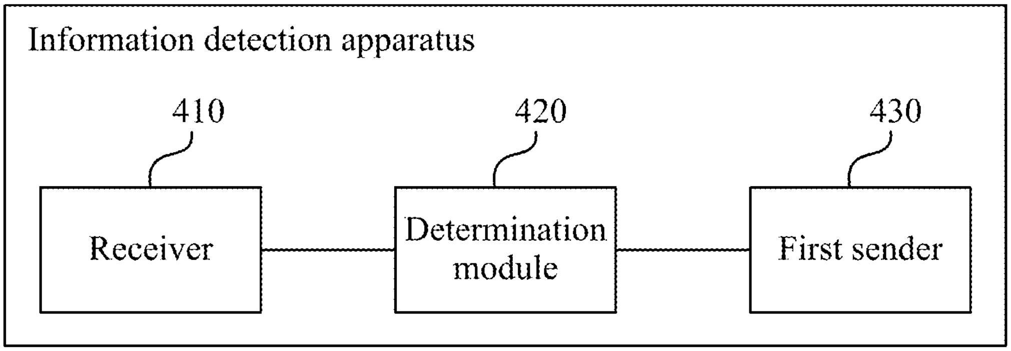
FIG. 4 is another structural diagram of an information detection apparatus according to an embodiment of the present application.

In an embodiment, FIG. 4 is another structural diagram of an information detection apparatus according to an embodiment of the present application. This embodiment is applied to a second communication node. As shown in FIG. 4, the information detection apparatus in this embodiment includes a receiver 410, a determination module 420 and a first sender 430.

The receiver 410 is configured to receive quality factor indication information sent by a first communication node.

The determination module 420 is configured to determine a slot value range according to a quality factor in the quality factor indication information.

The first sender 430 is configured to send response information to the first communication node in a slot corresponding to a slot value randomly selected from the slot value range.

In response to that a first command is detected in the slot corresponding to the selected slot value, response information is sent to the first communication node based on a subslot.

In an embodiment, in response to that the first command is detected in the slot corresponding to the selected slot value, a subslot value is randomly selected from N subslots, where N is a positive integer greater than 1.

In response to that the subslot value is equal to 0, the response information is sent to the first communication node.

In an embodiment, in response to that a second command is detected in the slot corresponding to the selected slot value, whether at least one of the following two conditions is satisfied is determined: no command or information other than the second command is received after the last time the response information is sent; or the response information sent by the second communication node matches confirmation information included in the second command.

In response to that at least one of the two conditions is satisfied, the second communication node determines that the response information sent by the second communication node is correctly received.

In an embodiment, in response to that a fourth command is detected in the slot corresponding to the selected slot value, when the subslot value of the second communication node is greater than 0, the subslot value of the second communication node is decreased by 1.

In an embodiment, in response to that a third command is detected in the slot corresponding to the selected slot value, when the subslot value of the second communication node is equal to 0 and the response information is not correctly received, a subslot is randomly reselected from M subslots.

Alternatively, when the subslot value of the second communication node is greater than 0, the subslot value of the second communication node is increased by a numerical value.

The information detection apparatus provided in this embodiment is configured to implement the information detection method applied to a second communication node In one or more embodiments shown in FIG. 2. The information detection apparatus provided in this embodiment uses similar implementation principles and has similar technical effects, which are not repeated here.

Figure 5:
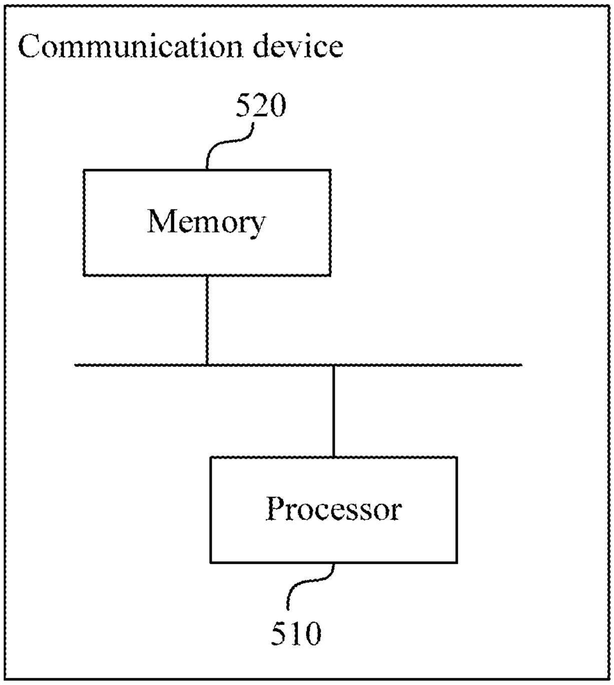
FIG. 5 is a structural diagram of a communication device according to an embodiment of the present application

In an embodiment, FIG. 5 is a structural diagram of a communication device according to an embodiment of the present application. As shown in FIG. 5, the device provided in the present application includes a processor 510 and a memory 520. One or more processors 510 may be disposed in the device. FIG. 5 shows one processor 510 as an example. One or more memories 520 may be disposed in the device. FIG. 5 shows one memory 520 as an example. The processor 510 and memory 520 of the device may be connected by a bus or in other manners. The connection by a bus is taken as an example in FIG. 5. In one or more embodiments, the device may be a base station.

As a computer-readable storage medium, the memory 520 may be configured to store software programs and computer-executable programs and modules, such as program instructions/modules (for example, the first sender 310 and the detector 320 in the information detection apparatus) corresponding to the device according to any embodiment of the present application. The memory 520 may include a program storage region and a data storage region. The program storage region may store an operating system and an application program required by at least one function. The data storage region may store data created according to the use of the device. Additionally, the memory 520 may include a high-speed random-access memory and may also include a nonvolatile memory such as at least one disk memory, a flash memory, or another nonvolatile solid-state memory. In some examples, the memory 520 may further include memories located remotely relative to the processor 510 and these remote memories may be connected to the device via the network. Examples of the preceding network include, but are not limited to, the Internet, an intranet, a local area network, a mobile communication network and a combination thereof.

In response to that the communication device is the first communication node, the preceding device may be configured to perform the information detection method applied to the first communication node provided in any preceding embodiment and has corresponding functions and effects.

In response to that the communication device is the second communication node, the preceding device may be configured to perform the information detection method applied to the second communication node provided in any preceding embodiment and has corresponding functions and effects.

An embodiment of the present application further provides a storage medium including computer-executable instructions which, when executed by a computer processor, cause the processor to perform an information detection method applied to a first communication node. The information detection method includes the following. Quality factor indication information is sent to at least one second communication node; response information sent by the at least one second communication node is detected based on slots within a slot value range determined according to a quality factor in the quality factor indication information; and in response to that it is detected that response information sent by at least two second communication nodes conflicts in a slot, response information of each of the at least two second communication nodes in the conflict slot is detected based on subslots in the conflict slot.

An embodiment of the present application further provides a storage medium including computer-executable instructions which, when executed by a computer processor, cause the processor to perform an information detection method applied to a second communication node. The information detection method includes the following. Quality factor indication information sent by a first communication node is received; a slot value range is determined according to a quality factor in the quality factor indication information; response information is sent to the first communication node in a slot corresponding to a slot value randomly selected from the slot value range; and in response to that a first command is detected in the slot corresponding to the selected slot value, response information is sent to the first communication node based on a subslot.

It is to be understood by those skilled in the art that the term "user equipment" encompasses any suitable type of wireless user equipment, for example, a mobile phone, a portable data processing apparatus, a portable web browser or a vehicle-mounted mobile station.

Generally speaking, embodiments of the present application may be implemented in hardware or special-purpose circuits, software, logic or any combination thereof. For example, some aspects may be implemented in hardware while other aspects may be implemented in firmware or software executable by a controller, a microprocessor or another computing apparatus, though the present application is not limited thereto.

The embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (a digital video disc (DVD) or a compact disc (CD)). The computer-readable media may include non-transitory storage media. The data processor may be of any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA) and a processor based on a multi-core processor architecture.

The above are merely several embodiments of the present application and are not intended to limit the present application, and for those skilled in the art, the present application may have various modifications and variations. Any modifications, equivalent substitutions, improvements and the like made within the essence and principle of the present application should fall within the scope of the present application.

What is claimed is:

1. An information detection method, applied to a first communication node, comprising:

sending quality factor indication information to at least one second communication node; and detecting response information sent by the at least one second communication node based on slots within a slot value range determined according to a quality factor in the quality factor indication information;

wherein in response to that it is detected that response information sent by at least two second communication nodes conflicts in a slot, the slot where the response information sent by at least two second communication nodes conflicts refers to as a conflict slot, the response information of each of the at least two second communication nodes in the conflict slot are detected based on subslots in the conflict slot.

2. The information detection method according to claim 1, wherein in response to that it is detected that the response information sent by the at least two second communication nodes conflicts in the slot, sending a command or indication information of a first information type to the at least two second communication nodes, wherein the command or indication information of the first information type is applied to the at least two second communication nodes in the conflict slot.

3. The information detection method according to claim 1, in response to that it is detected that the response information sent by the at least two second communication nodes conflicts in the slot, sending a first command to the at least two second communication nodes, wherein the first command is used for instructing that the at least two second communication nodes in the conflict slot to randomly select a subslot from N subslots.

4. The information detection method according to claim 1, in response to that response information sent by one second communication node among the at least two second communication nodes is detected in a subslot, sending a second command, wherein the second command indicates that the response information is correctly detected; or the second command indicates that a subslot value of the one second communication node in the conflict slot is decreased by 1.

5. The information detection method according to claim 1, in response to that it is detected that the response information sent by the at least two second communication nodes conflicts in a subslot, sending a third command, wherein the third command is used for instructing a second communication node with a subslot value equal to 0, among the at least two second communication nodes, to randomly reselect a subslot from M subslots, wherein M is a positive integer greater than 1; or the third command is used for indicating that a subslot value of a second communication node with a subslot value greater than 0, among the at least two second communication nodes, is increased.

6. The information detection method according to claim 1, wherein in response to that no response information sent by the at least two second communication node is detected in a subslot, sending a fourth command, wherein the fourth command is used for indicating that a subslot value of each of the at least two second communication nodes in the conflict slot is decreased by 1.

7. The information detection method according to claim 1, further comprising:

determining a varying step size S corresponding to a value Q of the quality factor based on a number of the at least two second communication nodes detected in the slot.

8. The information detection method according to claim 7, wherein the varying step size is a product value of a step size coefficient and a step size reference number, wherein the step size reference number is a predefined value or is indicated by the first communication node.

9. The information detection method according to claim 7, wherein in response to that the response information of the at least two second communication nodes is detected in the slot, the step size coefficient is monotonically increasing with the number of the at least two second communication nodes in the slot.

10. The information detection method according to claim 8, wherein Q1=Q1+S, and a value of Q1 is stored; Q is equal to rounding Q1 to an integer value, wherein an initial value of Q1 is indicated through indication information sent by the first communication node to the at least one second communication node.

11. An information detection method, applied to a second communication node, comprising:

receiving quality factor indication information sent by a first communication node;

determining a slot value range according to a quality factor in the quality factor indication information; and sending response information to the first communication node in a slot corresponding to a slot value randomly selected from the slot value range; wherein in response to that a first command is detected in the slot corresponding to the selected slot value, response information is sent to the first communication node based on a subslot.

12. The information detection method according to claim 11, wherein in response to that the first command is detected in the slot corresponding to the selected slot value, a subslot value is randomly selected from N subslots, wherein N is a positive integer greater than 1; and in response to that the subslot value is equal to 0, the response information is sent to the first communication node.

13. The information detection method according to claim 11, wherein in response to that a second command is detected in the slot corresponding to the selected slot value, whether at least one of the following two conditions is satisfied is determined: no command or information other than the second command is received after the last time the response information is sent; or, the response information sent by the second communication node matches confirmation information comprised in the second command; and in response to that at least one of the two conditions is satisfied, the second communication node determines that the response information sent by the second communication node is correctly received.

14. The information detection method according to claim 11, wherein in response to that a fourth command is detected in the slot corresponding to the selected slot value, when a subslot value of the second communication node is greater than 0, the subslot value of the second communication node is decreased by 1.

15. The information detection method according to claim 11, wherein in response to that a third command is detected in the slot corresponding to the selected slot value, when a subslot value of the second communication node is equal to 0 and the response information is not correctly received, a subslot is randomly reselected from M subslots;

or when a subslot value of the second communication node is greater than 0, the subslot value of the second communication node is increased by a numerical value.

16. A communication device, comprising a memory and one or more processors, wherein one or more programs is stored in the memory; and the one or more programs, when executed by the one or more processors, cause the one or more processors to perform;

sending quality factor indication information to at least one second communication node; and detecting response information sent by the at least one second communication node based on slots within a slot value range determined according to a quality factor in the quality factor indication information;

wherein in response to that it is detected that response information sent by at least two second communication nodes conflicts in a slot, the slot where the response information sent by at least two second communication nodes conflicts refers to as a conflict slot, the response information of each of the at least two second communication nodes in the conflict slot are detected based on subslots in the conflict slot.

17. A non-transitory computer-readable storage medium, wherein a computer program is stored in the storage medium, and the computer program, when executed by a processor, causes the processor to perform the information detection method according to claim 1.

18. A communication device, comprising a memory and one or more processors, wherein one or more programs is stored in the memory; and the one or more programs, when executed by the one or more processors, cause the one or more processors to perform the information detection method according to claim 11.

19. A non-transitory computer-readable storage medium, wherein a computer program is stored in the storage medium, and the computer program, when executed by a processor, causes the processor to perform the information detection method according to claim 11.

* * * * *